(12) United States Patent
Ressel et al.

(10) Patent No.: US 12,509,593 B2
(45) Date of Patent: Dec. 30, 2025

(54) BISMUTH CONTAINING ELECTROCOATING MATERIAL WITH IMPROVED CATALYTIC ACTIVITY

(71) Applicant: BASF COATINGS GMBH, Münster (DE)

(72) Inventors: Joerg Ressel, Münster (DE); Karl-Heinz Grosse Brinkhaus, Münster (DE); Dirk Benning, Münster (DE); Janine Juettemeyer, Münster (DE); Martin Geuting, Münster (DE); Silke Przybilla, Münster (DE); Joerg Exner, Münster (DE); Petra Wagner, Münster (DE)

(73) Assignee: BASF COATINGS GMBH, Muenster (DE)

( * ) Notice: Subject to any disclaimer, the term of this patent is extended or adjusted under 35 U.S.C. 154(b) by 405 days.

(21) Appl. No.: 17/999,623

(22) PCT Filed: Aug. 11, 2020

(86) PCT No.: PCT/EP2020/072466
§ 371 (c)(1),
(2) Date: Nov. 22, 2022

(87) PCT Pub. No.: WO2021/239264
PCT Pub. Date: Dec. 2, 2021

(65) Prior Publication Data
US 2023/0193056 A1  Jun. 22, 2023

(30) Foreign Application Priority Data

May 25, 2020 (EP) .................................. 20176265

(51) Int. Cl.
*C09D 7/61* (2018.01)
*C09D 5/44* (2006.01)

(52) U.S. Cl.
CPC ......... *C09D 5/4496* (2013.01); *C09D 5/4473* (2013.01); *C09D 5/448* (2013.01); *C09D 7/61* (2018.01)

(58) Field of Classification Search
None
See application file for complete search history.

(56) References Cited

U.S. PATENT DOCUMENTS

| | | | | | |
|---|---|---|---|---|---|
| 5,324,404 | A | * | 6/1994 | Ott | C09D 5/4492 525/484 |
| 5,702,581 | A | * | 12/1997 | Kerlin | C09D 5/448 204/504 |
| 5,908,912 | A | * | 6/1999 | Kollah | C09D 5/4492 528/48 |
| 6,274,649 | B1 | * | 8/2001 | Ott | C09D 5/4434 523/404 |
| 6,541,120 | B1 | * | 4/2003 | Klein | C09D 5/4492 428/458 |
| 7,781,054 | B2 | * | 8/2010 | Reuter | C09D 5/4492 428/323 |
| 8,425,747 | B2 | * | 4/2013 | Schulte | C08G 18/10 523/415 |
| 9,493,660 | B2 | * | 11/2016 | Grosse Brinkhaus | C09D 5/4496 |
| 9,914,840 | B2 | * | 3/2018 | Markou | C09D 17/008 |
| 9,920,205 | B2 | * | 3/2018 | Wapner | C25D 13/18 |
| 2007/0045116 | A1 | * | 3/2007 | Hung | C09D 5/4496 204/471 |
| 2007/0051634 | A1 | * | 3/2007 | Poole | C09D 5/4492 205/109 |
| 2010/0163418 | A1 | * | 7/2010 | Chouai | C09D 5/4438 524/610 |
| 2011/0094890 | A1 | * | 4/2011 | Grosse Brinkhaus | C08G 18/581 205/316 |

FOREIGN PATENT DOCUMENTS

| | | | |
|---|---|---|---|
| DE | 4409715 A1 | 9/1995 | |
| DE | 4434593 A1 | 4/1996 | |
| DE | 10001222 A1 | 8/2001 | |
| DE | 10236347 A1 | 2/2004 | |
| DE | 10236350 A1 | 2/2004 | |
| DE | 102007038824 A1 | 2/2009 | |
| EP | 0505445 A1 | 9/1992 | |
| EP | 0739389 A1 | 10/1996 | |
| EP | 0927232 A1 | 7/1999 | |
| EP | 1163302 A1 | 12/2001 | |
| EP | 1510558 A1 | 3/2005 | |
| EP | 2190936 A2 | 6/2010 | |
| EP | 2824418 A1 | 1/2015 | |
| WO | 9810024 A1 | 3/1998 | |
| WO | WO-2010077901 A1 * | 7/2010 | ......... C08G 59/1477 |
| WO | 2014074234 A1 | 5/2014 | |

(Continued)

OTHER PUBLICATIONS

Bismuth subsalicylate, ThermoFisher (Year: 2025).*

(Continued)

*Primary Examiner* — Peter A Salamon
(74) *Attorney, Agent, or Firm* — Armstrong Teasdale LLP

(57) ABSTRACT

Disclosed herein is an aqueous electrocoating material including at least one specific binder and at least one bismuth compound, a method of using the aqueous electrocoating material for at least partially electrocoating a substrate, a coated substrate obtained from said method and an article or component including said substrate.

17 Claims, No Drawings

(56) References Cited

FOREIGN PATENT DOCUMENTS

| | | | |
|---|---|---|---|
| WO | 2015070931 | A1 | 5/2015 |
| WO | 2015090443 | A1 | 6/2015 |

OTHER PUBLICATIONS

International Search Report and Written Opinion for corresponding PCT/EP2020/072466 mailed Jan. 25, 2021; 12 pages.
European Search Report for EP Patent Application No. 19206247.9, Issued on May 7, 2020, 4 pages.

* cited by examiner

BISMUTH CONTAINING ELECTROCOATING MATERIAL WITH IMPROVED CATALYTIC ACTIVITY

CROSS-REFERENCE TO RELATED APPLICATIONS

This application is a U.S. National Phase Application of International Patent Application No. PCT/EP2020/072466, filed Aug. 11, 2020, which claims priority to European Patent Application No. 20176265.5, filed May 25, 2020, each of which is hereby incorporated by reference herein.

The present invention relates to an aqueous electrocoating material comprising at least one specific binder and at least one bismuth compound, to its use in a method for at least partially electrocoating a substrate, a coated substrate obtained from said method and an article or component comprising said substrate.

STATE OF THE ART

A normal requirement within the automobile sector is that the metallic components used for manufacture must be protected against corrosion. The requirements concerning the corrosion prevention to be achieved are very stringent, especially as the manufacturers often give a guarantee against rust perforation over many years. Such corrosion prevention is normally achieved by coating the components, or the substrates used in their manufacture, with at least one coating apt for the purpose, typically an electrodeposition coating.

The electrodeposition process can be anodic or cathodic; typically, the article to be coated serves as the cathode. Electrodeposition processes are advantageous both economically and environmentally due to the high transfer efficiency of coating resin to the substrate and the low levels of organic solvent, if any, that are employed. Another advantage of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even and continuous coating layer formed over all portions of the metallic substrate provides maximum anticorrosion effectiveness.

Electrocoating baths typically comprise an aqueous dispersion or emulsion of a film-forming material, such as an epoxy resin, having ionic stabilization. A dispersion is typically a two-phase system of one or more finely divided solids, liquids, or combinations thereof in a continuous liquid medium such as water or a mixture of water and organic cosolvent. An emulsion is a dispersion of liquid droplets in a liquid medium, preferably water or a mixture of water and various cosolvents. Accordingly, an emulsion is a type of dispersion.

For automotive or industrial applications, the electrocoat compositions are formulated to be curable compositions by using self-crosslinking resins or including a crosslinker. During electrodeposition, a coating composition containing an ionically-charged resin is deposited onto a conductive substrate by submerging the substrate in an electrocoating bath having dispersed therein the charged resin and then applying an electrical potential between the substrate and a pole of opposite charge, for example, a stainless-steel electrode. The charged coating particles are plated or deposited onto the conductive substrate and the coated substrate is then heated to cure the coating.

There are numerous examples known from the patent literature of the production of electrocoating materials suitable for the above described electrocoating process. Compounds of tin and/or of bismuth, in particular, are employed as crosslinking catalysts in these materials. In recent times, bismuth compounds have been used preferentially as crosslinking catalysts, since in addition to their high activity they also possess a lower toxicity as compared to tin compounds.

The use of bismuth compounds as catalysts in the formation of urethane structures from isocyanate groups and hydroxyl groups is already well established (J. H. Saunders and K. C. Frisch, Polyurethanes, Chemistry and Technology from High Polymers, Vol. XVI, Part 1, Interscience Publishers, a division of John Wiley and Sons, New York, 4th Printing, July 1967, page 167). To date, however, the use of bismuth compounds as catalysts in connection with the production of electrocoat materials has been very limited.

In EP 0 642 558 the bismuth compounds that are candidates for the use of electrocoating materials are significantly restricted, since the readily available salts with relatively long-chain acids, such as bismuth octanoate and bismuth neodecanoate, for example, cause disruptions as a result of oily exudations when used in cationic binders. Furthermore, as a result of being mixed into the binder or into a pigment paste, inorganic bismuth compounds are said to be difficult to disperse and to have a low catalytic activity.

European patent EP 0 739 389 describes a simplified process for producing a corrosion control coating by means of electrodeposition coating, where the electrodeposition coating material comprises bismuth lactate or bismuth dimethyl propionate. Further possible bismuth compounds are mentioned, but without any details; in particular, the examples use only the salts of lactic acid and dimethyl propionic acid.

Further bismuth complexes based on amino acids (EP 0 927 232) or alkane sulfonic acids (EP 1 163 302) are described as useful and stable catalyst systems in electrocoat materials.

For improving the corrosion control of electrocoat materials DE 100 01 222 A1 cites the use of colloidal bismuth. That German patent uses bismuth salts of aliphatic carboxylic acids. A further use of bismuth salts of organic carboxylic acids is described in an electrocoat material in German patent application DE 44 34 593 A1. Toxic constituents are to be largely avoided in the preparation of that corrosion control coating material. German patent application DE 102 36 350 A1 describes electrocoating materials which comprise bismuth subsalicylate and which flow well, are free from surface defects, and ensure effective corrosion control. These known electrocoat materials, however, require a relatively high baking temperature to achieve sufficient crosslinking.

European patent application EP 2 190 936 A2 discloses the use of water-insoluble bismuth subnitrate to increase the catalytic activity of the bismuth crosslinking catalyst. This increased activity allows to reduce the temperature necessary for curing the deposited electrocoating layer. To guarantee a sufficient level of solubilized bismuth in the electrocoating composition, the bismuth subnitrate is grinded or dispersed with a grinding resin and pigments before being added to the aqueous binder and optionally crosslinker. However, comparatively large amounts of 0.5 to 5.0% by weight—based on the solids of the electrocoating composition—of bismuth subnitrate are necessary to ensure sufficient catalytic activity and crosslinking at lower curing temperatures.

Of advantage accordingly would be an aqueous electrocoating material in which the activity of the bismuth catalyst is further improved such that the amount of bismuth compound present in the material can be lowered while keeping the temperature necessary for curing of the deposited electrocoating material largely unchanged. The further improvement of catalytic activity should, however, not result in a negative influence on the storage stability, the deposition process or the properties of the obtained cured electrocoats.

OBJECT

The object of the present invention, accordingly, was that of providing an aqueous electrocoating material having an improved activity of the bismuth catalyst such that curing of the material can be performed at low temperatures without negatively influencing the achieved crosslinking density. However, the storage stability, the production process, the particle size, the filterability, the deposition properties and the properties of the resulting cured electrocoat should not be negatively influenced by the higher catalytic activity of the bismuth compound.

Technical Solution

The objects described above are achieved by the subject matter claimed in the claims and also by the preferred embodiments of that subject matter that are described in the description hereinafter.

A first subject of the present invention is therefore an aqueous electrocoating material (ECM) comprising
  (a) at least one binder B1 containing cationic or anionic groups and reactive functional groups which are able to undergo crosslinking reactions
    (i) with themselves or with complementary reactive functional groups present in said binder, or
    (ii) with complementary reactive functional groups present in a crosslinking agent (b),
  (b) optionally at least one crosslinking agent CA comprising the complementary reactive functional groups,
  (c) at least one bismuth compound and
  (d) at least one binder B2, said binder B2 being different from the at least one binder B1 and being obtained by reacting:
    (d-1) at least one compound C1 containing at least one epoxy group with
    (d-2) at least one hydroxy group containing compound C2 and
    (d-3) at least one compound C3 of general formula (I)

wherein
    $R^1$, $R^2$ independently from each other, are selected from hydrogen or a $C_1$-$C_4$ alkyl residue;
    $R^3$ is selected from hydrogen or a $C_1$-$C_4$ alkyl residue;
    a is an integral number of 1 to 8; and
    b is an integral number of 1 to 4; and
  (d-4) optionally at least one compound C4 comprising at least one primary and at least one tertiary amino group, characterized in that
  the molar ratio of compound C3 of general formula (I) to the at least one compound C1 containing at least one epoxy group is greater than 1:3.0.

The above-specified aqueous electrocoating material (ECM) is hereinafter also referred to as electrocoating material (ECM) of the invention and accordingly is a subject of the present invention. Preferred embodiments of the electrocoating material of the invention are apparent from the description hereinafter and also from the dependent claims.

In light of the prior art it was surprising and unforeseeable for the skilled worker that the object on which the invention is based could be achieved by using a binder B2 being prepared by a specific molar ratio of compound C3 of general formula (I) to compound C1 in combination with a bismuth catalyst. The use of a said binder B2 results in a higher amount of dissolved bismuth in the electrocoating material and thus in an increased crosslinking of the material upon curing in contrast to the use of binders, which are prepared by using a molar ration of compound C3 of general formula (I) to compound C1 of greater than 1:3.0. To achieve a comparable crosslinking density, either the curing temperature or the amount of bismuth compound present in the electrocoating material can therefore be reduced. Surprisingly, the amount of bismuth compound (c) can be reduced significantly in the inventive electrocoating material without drastically influencing the amount of soluble bismuth contained in the electrocoating material. However, this increased catalytic activity does not negatively influence the easy production, storage stability, optimum particle size in respect of the dispersed constituents and filterability of the inventive electrocoating materials. Furthermore, the inventive EC materials are easy to electrophoretically deposit without problems on electrically conductive substrates. The resulting electrocoats have good flow, are free from surface defects and specks, and afford outstanding corrosion control and edge protection.

A further subject of the present invention is a method for at least partly coating an electrically conductive substrate, said method comprising:
  (a) contacting the electrically conductive substrate, preferably connected as cathode, with the inventive aqueous electrocoating material (ECM),
  (b) optionally rinsing the coating layer obtained after step (a), and
  (c) curing the coating layer obtained after step (a) or (b).

Yet another subject of the present invention is an at least partly coated substrate obtained by the inventive method.

A final subject of the present invention is an article or component comprising the inventive at least partly coated substrate.

DETAILED DESCRIPTION

The measurement methods to be employed in the context of the present invention for determining certain characteristic variables are evident from the Examples section. Unless explicitly indicated otherwise, these measurement methods are to be used for determining the respective characteristic variable.

If reference is made in the context of the present invention to an official standard, this of course means the version of the standard that was current on the filing date, or, if no current version exists at that date, then the last current version.

All the temperatures exemplified in the context of the present invention are understood as the temperature of the room in which the coated substrate is present. What is thus not meant is that the substrate itself must have the particular temperature.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

Aqueous Electrocoating Material (ECM):

The first subject-matter of the present invention is an aqueous electrocoating material (ECM) containing a bismuth compound (c) and at least one specific binder B2 being prepared by using a molar ratio of the at least one compound C3 of general formula (I) to the at least one epoxy-group containing compound C1 of greater than 1:3.0, preferably at least 1:2.8.

The expression "aqueous electrocoating material" is known to the skilled person and refers to an electrocoating material which is not based exclusively on organic solvents. "Aqueous" in the context of the present invention should be understood preferably to mean that the electrocoating material comprises a water fraction of at least 20 wt. %, preferably at least 25 wt. %, very preferably at least 50 wt. %, based in each case on the total amount of the solvents present (that is, water and organic solvents). The water fraction in turn is preferably 60 to 100 wt. %, more particularly 65 to 90 wt. %, very preferably 70 to 85 wt. %, based in each case on the total amount of the solvents present.

Binder B1 (a):

The inventive aqueous electrocoating material (ECM) comprises as first mandatory component (a) at least one binder B1. The term "binder" in the sense of the present invention and in agreement with DIN EN ISO 4618 (German version, date: March 2007), refers preferably to those nonvolatile fractions of the composition of the invention that are responsible for forming the film, with the exception of any pigments and fillers therein, and more particularly refers to the polymeric resins which are responsible for film formation. The nonvolatile fraction may be determined by the method described in the Examples section.

The binders B1 may be self-crosslinking and/or externally crosslinking. Self-crosslinking binders B1 contain reactive functional groups which are able to undergo thermal crosslinking reactions with themselves and/or with complementary reactive functional groups in the self-crosslinking binders B1. In contrast, externally crosslinking binders B1 contain reactive functional groups which are able to undergo thermal crosslinking reactions with complementary reactive functional groups in crosslinking agents CA.

The amount of the at least one binder B1 in the EC materials of the invention is guided in particular by its solubility and its dispersibility in the aqueous medium as well as by its functionality with regard to the crosslinking reactions with itself or with the crosslinker CA, and may therefore be determined readily be the skilled worker on the basis of his or her general art knowledge. Preferably, the at least one binder B1 is present in a total amount of 50 to 90% by weight—based on solid content of the electrocoating material (ECM).

If the at least one binder B1 is used in cathodically depositable electrocoating materials (ECM), it contains potentially cationic and/or cationic groups. Examples of suitable potentially cationic groups which can be converted into cations by neutralizing agents and/or quaternizing agents are primary, secondary or tertiary amino groups, secondary sulfide groups or tertiary phosphine groups, especially tertiary amino groups or secondary sulfide groups. Examples of suitable cationic groups are primary, secondary, tertiary or quaternary ammonium groups, tertiary sulfonium groups or quaternary phosphonium groups, preferably quaternary ammonium groups or tertiary sulfonium groups, but especially quaternary ammonium groups.

Examples of suitable neutralizing agents for the potentially cationic groups are inorganic and organic acids such as sulfuric acid, hydrochloric acid, phosphoric acid, formic acid, acetic acid, lactic acid, dimethylolpropionic acid or citric acid, especially formic acid, acetic acid or lactic acid.

Examples of suitable binders B1 for cathodically depositable electrocoat materials are known from the state of the art. These are preferably resins containing primary, secondary, tertiary or quaternary amino or ammonium groups and/or tertiary sulfonium groups and having amine numbers of preferably between 20 and 250 mg KOH/g and a weight-average molecular weight of from 300 to 10 000 Daltons. In particular, use is made of amino (meth)acrylate resins, amino epoxy resins, amino epoxy resins with terminal double bonds, amino epoxy resins with primary and/or secondary hydroxyl groups, amino polyurethane resins, amino-containing polybutadiene resins or modified epoxy resin-carbon dioxide-amine reaction products.

Alternatively, the binder B1 may comprise anionic and/or potentially anionic groups. Binders B1 of this kind are used in anionically depositable electrocoat materials. Examples of suitable potentially anionic groups which can be converted into anions by neutralizing agents are carboxylic, sulfonic or phosphonic acid groups, especially carboxylic acid groups. Examples of suitable anionic groups are carboxylate, sulfonate or phosphonate groups, especially carboxylate groups.

Examples of suitable neutralizing agents for the potentially nonionic groups are ammonia, ammonium salts, such as ammonium carbonate or ammonium hydrogen carbonate, for example, and also amines, such as trimethylamine, triethylamine, tributylamine, dimethylaniline, diethyl aniline, triphenylamine, dimethylethanolamine, diethylethanolamine, methyldiethanolamine, triethanolamine, and the like.

The amount of neutralizing agent is generally chosen such that from 1 to 100 equivalents, preferably from 50 to 90 equivalents, of the potentially cationic or potentially anionic groups of a binder B1 are neutralized.

Examples of suitable binders B1 for anionically depositable electrocoat materials are known from German patent application DE 28 24 418 A1. They are preferably polyesters, epoxy resin esters, poly(meth)acrylates, maleate oils or polybutadiene oils having a weight-average molecular weight of from 300 to 10 000 Daltons and an acid number of from 35 to 300 mg KOH/g.

Particularly preferred aqueous coating materials (ECM) are cathodically depositable and thus comprise at least one binder B1 having cationic groups as described before.

Examples of suitable reactive functional groups of the binder B1 are hydroxyl groups, thiol groups, and primary and secondary amino groups, especially hydroxyl groups. In case of externally crosslinking binders, suitable complementary reactive functional groups are blocked isocyanate groups, hydroxymethylene and alkoxymethylene groups, preferably methoxymethylene and butoxymethylene groups, and especially methoxymethylene groups. Preference is given to using blocked isocyanate groups.

Crosslinking Agent CA (b):

The inventive aqueous electrocoating material (ECM) can comprise as component (b) at least one crosslinking agent CA. According to a preferred embodiment, at least one externally crosslinking binder B1 is used in combination with at least one crosslinking agent CA.

Suitable crosslinking agents CA include all customary and known crosslinking agents which contain suitable complementary reactive functional groups. The crosslinking agents CA are preferably selected from the group consisting of blocked polyisocyanates, melamine-formaldehyde resins, tris(alkoxycarbonylamino)triazines, and polyepoxides. The crosslinking agents CA are more preferably selected from the group consisting of blocked polyisocyanates and highly reactive melamine-formaldehyde resins. Blocked polyisocyanates are used with particular preference.

Blocked polyisocyanates CA can be prepared from customary and known polyisocyanates containing aliphatically, cycloaliphatically, araliphatically and/or aromatically attached isocyanate groups. Preference is given to using polyisocyanates having from 2 to 5 isocyanate groups per molecule and having viscosities of from 100 to 10,000 mPa*s, preferably from 100 to 5,000 mPa*S, and in particular from 100 to 2,000 mPa*s (at 23° C.). Moreover, the polyisocyanates may be hydrophilically or hydrophobically modified.

Suitable polyisocyanates include aliphatic polyisocyanates, aromatic polyisocyanates or mixtures of aromatic and aliphatic polyisocyanates. It is possible here to use not only monomeric polyisocyanates, dimers or trimers of the polyisocyanates, but also oligomeric or polymeric polyisocyanates. Preferred isocyanates are those whose monomeric constituent contains about 3 to about 36, more particularly about 8 to about carbon atoms. Examples of such suitable monomeric polyisocyanates are diisocyanates such as trimethylene diisocyanate, tetramethylene diisocyanate, pentamethylene diisocyanate, hexamethylene diisocyanate, propylene diisocyanate, ethylethylene diisocyanate, methyltrimethylene diisocyanate, trimethylhexamethylene diisocyanate, xylylene diisocyanate, 1,3-cyclopentylene diisocyanate, 1,4-cyclohexylene diisocyanate, 1,2-cyclohexylene diisocyanate, 4,4'-diphenylmethane diisocyanate, 1,5-naphthylene diisocyanate, toluene 2,4-diisocyanate, isophorone diisocyanate, and 4,4'-diisocyanatodicyclohexylmethane. Polyisocyanates of higher isocyanate functionality can also be used, such as tris(4-isocyanatophenyl) methane, 2,4,4'-triisocyanatodiphenylmethane, or bis(2,5-diisocyanato-4-methylphenyl)-methane. These polyisocyanates may be used in the form of the dimer or trimer, or may serve as building blocks for oligomeric or polymeric polyisocyanates. Furthermore, mixtures of polyisocyanates can also be utilized.

Examples of suitable blocking agents for preparing the blocked polyisocyanates CA are phenols, such as phenol, cresol, xylenol, nitrophenol, chlorophenol, ethylphenol, tert-butylphenol, hydroxybenzoic acid, esters of this acid or 2,5-di-tert-butyl-4-hydroxytoluene;

lactams, such as ε-caprolactam, δ-valerolactam, γ-butyrolactam or β-propiolactam;

active methylenic compounds, such as diethyl malonate, dimethyl malonate, methyl or ethyl acetoacetate or acetylacetone;

alcohols such as methanol, ethanol, n-propanol, isopropanol, n-butanol, isobutanol, tert-butanol, n-amyl alcohol, tert-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyl-dimethanol or acetocyanohydrin;

mercaptans such as butyl mercaptan, hexyl mercaptan, tert-butyl mercaptan, tert-dodecyl mercaptan, 2-mercaptobenzothiazole, thiophenol, methylthiophenol or ethylthiophenol;

acid amides such as acetoanilide, acetoanisidinamide, acrylamide, methacrylamide, acetamide, stearamide or benzamide;

imides such as succinimide, phthalimide or maleimide;

amines such as diphenylamine, phenylnaphthylamine, xylidine, N-phenylxylidine, carbazole, aniline, naphthylamine, butylamine, dibutylamine or butylphenylamine;

imidazoles such as imidazole or 2-ethylimidazole;

ureas such as urea, thiourea, ethyleneurea, ethylenethiourea or 1,3-diphenylurea;

carbamates such as phenyl N-phenylcarbamate or 2-oxazolidone;

imines such as ethylenimine;

oximes such as acetone oxime, formaldoxime, acetaldoxime, acetoxime, methyl ethyl ketoxime, diisobutyl ketoxime, diacetyl monoxime, benzophenone oxime or chlorohexanone oximes;

salts of sulfurous acid such as sodium bisulfite or potassium bisulfite;

hydroxamic esters such as benzyl methacrylohydroxamate (BMH) or allyl methacrylohydroxamate; or substituted pyrazoles, imidazoles or triazoles; and also 1,2-polyols such as ethylene glycol, propylene glycol, and 1,2-butanediol;

2-hydroxy esters such as 2-hydroxyethyl acrylate, 2-hydroxyethyl methacrylate;

and mixtures of these blocking agents BA.

The amount of the above-described crosslinking agents CA In the EC materials of the invention is guided in particular by their functionality with regard to the crosslinking reaction with the binders B1 and B2 later described in detail and may therefore readily be determined by the skilled worker on the basis of his or her general art knowledge. Preferably, the at least one crosslinker CA is present in a total amount of 15 to 30% by weight—based on total solid content of the electrocoating material (ECM).

Bismuth Compound (c):

The inventive aqueous electrocoating material (ECM) comprises as second mandatory component (c) at least one bismuth compound (c).

In accordance with the invention, the bismuth compound (c) preferably has a bismuth content from 70% to 75% by weight as determined according to DAB7 [German Pharmacopoeia].

Particularly suitable bismuth compounds (c) are selected from basic bismuth nitrates, preferably water insoluble bismuth nitrates such as bismuth subnitrate.

The bismuth subnitrate preferably has the empirical formula (II)

$$4(BiNO_3(OH)_2)BiO(OH).$$

Bismuth subnitrate is a commercial compound and is sold, for example, by the company MCP HEK GmbH, Lubeck, Germany.

The electrocoating materials of the invention (ECM), based on their solids content, contain preferably 0.05% to 5%, more preferably 0.5% to 4% by weight of the bismuth compound (c), especially bismuth subnitrate of the empirical formula (II).

Binder B2 (d):

The inventive aqueous electrocoating material (ECM) comprises as third mandatory component (d) at least binder B2 prepared by a molar ratio of the at least one compound C3 of general formula (I) to the at least one epoxy-group containing compound C1 of greater than 1:3.0, preferably at least 1:2.8. Use of said binder B2 leads to a significantly increased amount of solubilized bismuth in the aqueous electrocoating material and thus results in improved crosslinking density when compared to electrocoating materials comprising binders being prepared by using a lower amount of compound C3 of general formula (I). Therefore, curing can be performed at lower temperatures leading to a lower risk of underbaking. Surprisingly, a significant reduction in the amount of bismuth compound (c) only leads to a slight decrease in the amount of solubilized bismuth if the at least one binder B2 is contained in the aqueous electrocoating material (ECM). Thus, the amount of bismuth compound (c) can be drastically reduced without a negative influence on the crosslinking density achieved after curing of the inventive electrocoating material (ECM).

The at least one binder B2 is different from the binder B1 described in detail above and is obtained by reacting compound C1 with compounds C2 to C3 and optionally C4, namely:

at least one compound C1 containing at least one epoxy group with at least one hydroxy group containing compound C2 and at least one specific compound C3 and optionally at least one compound C4 comprising at least one primary and at least one tertiary amino group, with the proviso that the molar ratio of the at least one specific compound C3 to the at least one compound C1 is greater than 1:3.0, preferably at least 1:2.8.

Component C1 can be any compound containing at least one reactive epoxide group. Said compound C1 preferably has an epoxide equivalent weight (EEW) of below 1,000 g/Eq., more preferably below 500 g/Eq., very preferably of 160 to 450 mol/Eq.

Particularly preferred epoxide compounds are polyphenol diglycidyl ethers prepared from polyphenols and epihalohydrins. Examples of polyphenols which can be employed are bisphenol A, bisphenol F, 1,1-bis(4-hydroxyphenyl)-n-heptane, 4,4-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)-methane, 1,5-dihydroxynaphthalene and phenolic novolak resins. Particular suitable polyphenols are selected from bisphenol A, bisphenol F and 1,1-bis(4-hydroxyphenyl)-n-heptan.

Further preferred epoxide compounds are diglycidyl ethers of polyhydric alcohols, such as ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane. It is also possible to use diglycidyl esters of polycarboxylic acids, such as, for example, oxalic acid, succinic acid, glutaric acid, terephthalic acid, 2,6-naphthalenedicarboxylic acid, dimerized linolenic acid, etc. Typical examples are glycidyl adipate and glycidyl phthalate. Also suitable are hydantoin epoxides, epoxidized polybutadiene and diepoxide compounds obtained by epoxidation of an olefinically unsaturated alicyclic compound.

It is particularly preferred if at least two different compounds C1-1 and C1-2, very preferably exactly two compounds C1-1 and C1-2, are reacted with compounds C2 to C4. Said different compounds C1-1 and C1-2 both comprise at least one epoxy group but preferably differ in their epoxy equivalent weight (EEW).

The compound C1-1 preferably has an epoxy equivalent weight of 160 to 250 g/Eq., more preferably 170 to 220 g/Eq., very preferably 180 to 200 g/Eq., while compound C1-2 preferably has a higher epoxy equivalent weight of 350 to 450 g/Eq., more preferably 360 to 430 g/Eq., very preferably 370 to 410 g/Eq. Suitable compounds C1-1 are, for example, high viscosity liquid epoxy resin based on bisphenol A diglycidyl ether having an epoxy equivalent of 184 to 190 g/Eq. (ISO3001) and a viscosity of 12,000 to 14,000 mPa*s (ISO 12058-1, 25° C., falling ball). Suitable compounds C1-2 are, for example, polypropylenglycol diglycidyl ethers with an epoxy equivalent of 385 to 405 g/Eq. (ISO3001) and a viscosity of 42 to 52 mPa*s (ISO 12058-1, 25° C., falling ball).

Compounds C1-1 and C1-2 are preferably used in specific molar ratios of C1-1 to C1-2 of 2:1 to 1:2, more preferably 1.8:1, very preferably 1.8:1.4.

Component C2 contains at least one hydroxy group and is preferably selected from aromatic or aliphatic compounds. It is particularly preferred if component C2 contains exactly one hydroxy group and reacts in a monofunctional manner with respect to epoxide groups of compound C1. Component C2 is preferably a compound $R^4$—OH, where $R^4$ is preferably a residue of general formula (IV)

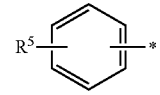

(IV)

with $R^5$ being H, C1-C20 alkyl, preferably t-butyl, nonyl or dodecyl, or a residue $R^6$—O—* with $R^6$ being $C_1$-$C_{10}$ alkyl, preferably methyl or HO—$(CHR^7CH2\text{-}O)_n$—$CHR^7CH_2$—* where n=0 to 10 and $R^7$=hydrogen or methyl. The symbol * denotes the connection of the respective residue to the compound $R^4$—OH or to the residue of general formula (IV).

Especially suitable compounds C2 are thus monophenols, diphenols, for example bisphenol A, or a mixture of mono- and diphenols. A particularly suitable compound is the aromatic hydroxy compound 4-dodecyl phenol.

The compound C3 has the general formula (I)

$$R^1R^2N\text{—}(CH_2)_a\text{—}O\text{—}[CH_2\text{—}CH(R^3)]_b\text{—}OH \qquad (I)$$

and thus comprises at least one primary, secondary or tertiary amino group as well as a hydroxy group.

Particularly preferred compounds C3 of general formula (I) comprise a primary amino group. Thus, residues $R^1$ and $R^2$ in general formula (I) favorably are, independently from each other, selected from hydrogen.

Residue $R^3$ in general formula (I) is preferably selected from hydrogen.

Parameter a in general formula (I) is preferably an integral number of 1 to 6, preferably 1 to 4, very preferably 2.

Parameter b in general formula (I) is preferably an integral number of 1 to 3, preferably 1 to 2, very preferably 1.

A particularly preferred compound C3 of general formula (I) is therefore H2N—(CH$_2$)$_2$-O—[CH$_2$-CH$_2$]—OH or 2-(2-aminoethoxy)ethanol.

The compounds C3 of general formula (I) and C1 must be used in a molar ratio of greater than 1:3.0 to prepare binder B2. Molar ratios of less than 1:3.0 result in poorer solubilization of the bismuth compound (c), thus requiring higher curing temperatures or higher amounts of bismuth compound (c) to effect comparable crosslinking. The molar ratio of the at least one compound C3 of general formula (I) to the at least one compound C1 containing at least one epoxy group is preferably at least 1:2.8, in particular 1:1 to 1:2.5, more preferably 1:1 to 1:2, even more preferably 1:1 to 1:1.7, very preferably 1:1.3 to 1:1.6. If more than one compound C1 containing at least one epoxy group is used to prepare binder B2, the total amount of compounds C1 containing at least one epoxy group is used in the calculation of the above-specified molar ratios.

Optional compound C4 comprises at least one primary and at least one tertiary amine group. Said compound C4 should preferably be a water-soluble compound. Examples of such amines are dialkylaminoalkylamines, such as, for example, dimethylaminoethylamine, diethylamino propylamine, dimethylaminopropylamine and the like. In most cases, low-molecular-weight amines are used, but it is also possible to use relatively high-molecular-weight monoamines. A particularly preferred compound C4 is selected from 3-(dimethylamino)-1-propylamine.

Polyamines containing primary and tertiary amino groups can be reacted with the epoxides in the form of their ketimines. The ketimines are prepared from the polyamines in a known manner.

The charges which are necessary for water-dilutability and electrodeposition of binder B2 can be generated by protonation by means of water-soluble acids (for example boric acid, formic acid, lactic acid, propionic acid, butyric acid, carbonic acid or preferably acetic acid) or alternatively by reaction of the oxirane groups with salts of an amine or a sulfide/acid or phosphine/acid mixture. The salt of an amine is preferably the salt of a tertiary amine. Preferred amines are tertiary amines, such as dimethyl ethanolamine, triethylamine, trimethylamine, tripropyl amine and the like.

Through addition of catalysts, preferably phosphine or a phosphine derivative or phosphine salt, the reaction of components C1 and C2 can be controlled in such a way that only phenolic hydroxyl groups, but not secondary hydroxyl groups which might be present in component C2, react with epoxide groups. The phosphine used can be any desired phosphine containing no interfering groups. Examples of such phosphines are aliphatic, aromatic or alicyclic phosphines, specific examples of such phosphines which may be mentioned being the following: lower trialkylphosphines, such as trimethylphosphine, triethylphosphine, tripropylphosphine, tributyl phosphine, mixed lower alkylphenylphosphines, such as phenyldimethylphosphine, phenyldiethylphosphine, phenyldipropylphosphine, diphenylmethylphosphine, di phenylethylphosphine, diphenylpropylphosphine, tri phenylphosphine, alicyclic phosphines, such as tetra methyleneethylphosphine and the like.

Thus, it is preferred if a catalyst, preferably triphenyl phosphine, is used to prepare the at least one binder B2.

A particularly preferred binder B2 is obtained by reacting:
(d-1) a compound C1-1 having an epoxy equivalent weight of 180 to 200 g/Eq. and a one compound C1-2 having an epoxy equivalent weight of 370 to 410 g/Eq. with (d-2) at least one hydroxy group containing compound C2, said compound C2 being selected from aromatic hydroxy compounds, preferably 4-dodecyl phenol and
(d-3) at least one compound C3 of general formula (I)

wherein
R$^1$ and R$^2$ are, independently from each other, selected from hydrogen,
R$^3$ is selected from hydrogen,
a is an integral number of 1 to 6, preferably 1 to 4, very preferably 2, and
b is an integral number of 1 to 3, preferably 1 to 2, very preferably 1 and
(d-4) at least one compound C4 comprising at least one primary and at least one tertiary amino group, preferably 3-(dimethylamino)-1-propylamine,
wherein the molar ratio of the at least one compound C3 of general formula (I) the compounds C1-1 and C1-2 is 1:1.49. The molar ratio is in this case calculated by using the total molar amount of compounds C1-1 and C1-2 as well as the total molar amount of compound C3.

Further Optional Components:

Additionally, the EC materials of the invention may further comprise at least one customary and known additive selected from the group consisting of catalysts other than bismuth compound (c); pigments; anticrater additives; polyvinyl alcohols; polyvinylethers; dendritic polyethers or polyesters; polyurea resins; polyetheramine microgels; polyurethane microgels; polyurethanes; thermally curable reactive diluents; molecularly dispersedly soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermolabile free-radical initiators; adhesion promoters; leveling agents; film-forming auxiliaries; flame retardants; corrosion inhibitors; flow aids; waxes; siccatives; biocides, and flatting agents. The additive content may vary very widely according to intended use. The amount, based on the total weight of the aqueous electrocoating material (ECM), is preferably 0.1 to 20 wt. %, more preferably 0.1 to 15 wt. %, very preferably 0.1 to 10 wt. %, especially preferably 0.1 to 5 wt. %, and more particularly 0.1 to 2.5 wt. %.

Pigments are preferably used as additives. The pigments are preferably selected from the group consisting of customary and known color pigments, effect pigments, electrically conductive pigments, magnetically shielding pigments, fluorescent pigments, extender pigments, and anticorrosion pigments, organic and inorganic. The pigment content of the aqueous electrocoating material (ECM) may vary according to intended use and according to the nature of the pigments. The amount, based in each case on the total weight of the aqueous electrocoating material (ECM), is preferably in the range from 0.1 to 30 wt. % or in the range from 0.5 to 20 wt. %, more preferably in the range from 1.0 to 15 wt. %, very preferably in the range from 1.5 to 10 wt. %, and more particularly in the range from 2 to 5 wt. %, or in the range from 2 to 4 wt. %, or in the range from 2 to 3.5 wt. %.

The aqueous electrocoating material (ECM) preferably contains an amount of dissolved bismuth in the range of 600 to 2,000 ppm, more preferably 800 to 1,800 ppm, very preferably 900 to 1,500 ppm, based in each case on the total weight of the electrocoating material (ECM). According to the invention, the term "bismuth", refers to cathodic bismuth atoms of various valences. The bismuth here may be in trivalent form (Bi(III)), but alternatively or additionally may also be in other oxidation states. The amount of dissolved bismuth, calculated as metal, can be determined by the method described in the working examples (ICP-OES). The dissolved bismuth in the inventive electrocoating material (ECM) is obtained by the use of the bismuth compound (c) previously described.

The term "dissolved bismuth" is preferably understood such that bismuth is present in dissolved form in the electrocoating material (ECM) at a temperature of 20° C. of said material. Before it is introduced into the electrocoating material (ECM), therefore, the bismuth compound (c) is preferably part of a compound of at least limited water-solubility, more particularly of a bismuth salt of at least limited water-solubility. By introducing a bismuth salt of at least limited water-solubility into the electrocoating material (ECM), at least a part of the bismuth salt is then dissolved to provide the content of dissolved bismuth stated above. Dissolution of the at least one bismuth compound (c) can be obtained, for example, by complexation with chelating agents or by emulsification with the at least one binder B2 present in the electrocoating material (ECM).

Preferably, the bismuth compound (c) is introduced into the inventive aqueous electrocoating material (ECM) by grinding said compound (c) with the at least one binder B2 (component (d) previously described). This leads to a higher fraction of dissolved bismuth than the fraction either obtained by the water-solubility of the particular bismuth compound (c) or the use of binders being prepared by using a molar ratio of the compound C3 of general formula (I) to the epoxy containing compound C1 of, for example, at least 1:2.8.

This aqueous electrocoating material (ECM) preferably has a nonvolatile fraction, in other words a solids content, in a range from 10 to 30 wt. %, preferably 15 to 25 wt. %, based in each case on the total weight of the electrocoating material (ECM). Methods for determining the solids content are known to the skilled person. The solids content is determined preferably as stated in the experimental section below.

Preparation of the Inventive Electrocoating Material (ECM):

The EC materials of the invention are preferably prepared by mixing and homogenizing a pigment paste prepared by grinding the respective pigment with the above-described components (c) and (d) with an aqueous dispersion of the above-described components (a) and (b). Mixing and homogenization can be performed by using customary and known mixing techniques and apparatus such as stirred tanks, stirred mills, extruders, kneading apparatus, Ultraturrax, inline dissolvers, static mixers, micromixers, toothed-gear dispersers, pressure relief nozzles and/or microfluidizers. The pigment paste is prepared by methods known to the person skilled in the art. The use of component (d) as grinding resin to prepare the bismuth containing pigment paste results in significantly increased amounts of dissolved bismuth in the inventive electrocoating materials (ECM). This increased amount of dissolved bismuth leads to improved crosslinking at lower curing temperatures and allows to significantly reduce the amount of bismuth used to prepare the pigment paste.

Method for at Least Partially Coating an Electrically Conductive Substrate:

Step (a):

According to step (a) of the inventive method, an electrically conductive substrate which is connected to a current circuit, preferably as cathode, is contacted with the inventive electrocoating material (ECM) described previously. The electrically conductive substrate preferably comprises a motor vehicle or part thereof.

The application of the electrocoating material (ECM) to the substrate, or the production of a coating film on the substrate, are understood as follows: the electrocoating material (ECM) is applied in such a way that the coating film produced therefrom is arranged on the substrate but need not necessarily be in direct contact with the substrate. Thus, other layers can be present between the coating film and the substrate. For example, a conversion coating, such as a zinc phosphate coating, may be arranged between the substrate and the cured electrocoating layer.

"Contacting" in the sense of the present invention refers preferably to the immersing of the substrate into the aqueous electrocoating material (ECM) as well as the spraying or roll application of the substrate with the electrocoating composition (ECM). More particularly, the term "contacting" in the sense of the present invention refers to immersing of the substrate into the aqueous electrocoating material (ECM).

The method of the invention is preferably a method for at least partly coating an electrically conductive substrate used in and/or for automobile construction. The method may take place continuously in the form of a strip coating operation, such as in the coil coating process, for example, or discontinuously.

Within step (a) of the method of the invention, the substrate is at least partly coated with the aqueous electrocoating material (ECM) of the invention by electrophoretic, preferably cataphoretic, deposition of this coating material on the substrate surface. This is accomplished by introducing the substrate at least partly, preferably completely, preferably into a dip-coating bath containing the inventive electrocoating material (ECM) and applying an electrical voltage between the substrate and at least one counterelectrode. The counterelectrode may in this case be located in the dip-coating bath. Alternatively or additionally, the counterelectrode may also be present separately from the dip-coating bath, for example via an anion exchange membrane which is permeable to anions. In this case, anions formed during dip coating are transported from the coating material through the membrane into the anolyte, allowing the pH in the dip-coating bath to be regulated or kept constant. The counterelectrode is preferably separate from the dip-coating bath. The passage of electrical current between anode and cathode is accompanied by deposition of a firmly adhering paint film on the cathode, i.e., on the substrate.

Step (a) of the method of the invention is carried out preferably at a temperature in a range from 25 to 35° C. and a voltage of 120 to 350 V, preferably of 150 to 320 V. The voltage may be kept constant during the stated duration. Alternatively, however, the voltage may also adopt different values during the deposition duration within the minimum and maximum previously listed—for example, it may swing back and forth or rise in ramp or step form from the minimum to the maximum deposition voltage. In step (a) of the method of the invention, preferably, there is full coating of the substrate with the aqueous electrocoating material (ECM) of the invention, by complete electrophoretic, preferably cataphoretic, deposition on the entire substrate surface.

In step (a) of the method of the invention, the aqueous electrocoating material (ECM) of the invention is preferably applied such that the resulting cured electrocoat film has a dry film thickness in the range from 5 to 40 μm, more preferably from 10 to 30 μm, especially preferably from 20 to 25 μm.

Step (b):

In this optional step, the at least partially coated substrate is rinsed with water. The implementation of optional step (b) permits the recycling of excess constituents of the inventively employed aqueous electrocoating material (ECM), present after step (a) on the at least partly coated substrate, into the dip-coating bath.

Step (c):

In step (c) of the inventive method, the coating layer obtained from at least partially applying the inventive aqueous electrocoating material (ECM) on the substrate after step (a) or (b) is cured.

Curing of a the electrocoating film is understood to mean the conversion of such a film to the ready-to-use state, i.e. to a state in which the substrate provided with the respective coating film can be transported, stored and used as intended. More particularly, a cured coating film is no longer soft or tacky, but has been conditioned as a solid coating film which does not undergo any further significant change in its properties, such as hardness or adhesion on the substrate, even under further exposure to curing conditions.

Step (c) of the method of the invention is carried out preferably by means of baking after step (a) or (b), preferably in an oven. The curing here takes place preferably at a substrate temperature in the range from 100 to 250° C., more preferably 130 to 190° C. Step (c) takes place preferably over a duration of 10 to 30 minutes, more preferably 15 minutes.

All preferred embodiments described hereinabove in connection with the aqueous electrocoating material (ECM) of the invention are also preferred embodiments of the aqueous electrocoating material (ECM) used in step (a) of the inventive method.

Coated Substrate and Component or Article Comprising the Coated Substrate

A further subject of the present invention is an at least partly coated electrically conductive substrate which is obtainable by means of the method of the invention.

A further subject of the present invention is a preferably metallic component or preferably metallic article each produced from at least one such substrate.

Such articles may be, for example, metal strips. Components of this kind may also however—and preferably in the context of the present invention—be bodies and bodywork parts of vehicles such as automobiles, trucks, motorcycles, buses, and coaches, and components of electrical household products, or else components from the area of apparatus claddings, façade claddings, ceiling claddings, or window profiles.

The invention is described in particular by the following embodiments:

Embodiment 1: Aqueous electrocoating material (ECM) comprising—based on its total weight—
(a) at least one binder B1 containing cationic or anionic groups and reactive functional groups which are able to undergo crosslinking reactions
  (i) with themselves or with complementary reactive functional groups present in said binder, or
  (ii) with complementary reactive functional groups present in a crosslinking agent (b),
(b) optionally at least one crosslinking agent CA comprising the complementary reactive functional groups,
(c) at least one bismuth compound and
(d) at least one binder B2, said binder B2 being different from the at least one binder B1 and being obtained by reacting:
  (d-1) at least one compound C1 containing at least one epoxy group with
  (d-2) at least one hydroxy group containing compound C2 and
  (d-3) at least one compound C3 of general formula (I)

$$R^1R^2N-(CH_2)_a-O-[CH_2-CH(R^3)]_b-OH \qquad (I)$$

wherein
    $R^1$, $R^2$ independently from each other, are selected from hydrogen or a $C_1$-$C_4$ alkyl residue;
    $R^3$ is selected from hydrogen or a $C_1$-$C_4$ alkyl residue;
    a is an integral number of 1 to 8; and
    b is an integral number of 1 to 4; and
  (d-4) optionally at least one compound C4 comprising at least one primary and at least one tertiary amino group,
characterized in that
the molar ratio of compound C3 of general formula (I) to the at least one compound C1 containing at least one epoxy group is at least 1:2.8.

Embodiment 2: aqueous electrocoating material (ECM) according to embodiment 1, characterized in that the at least one binder B1 is present in a total amount of 50 to 90% by weight—based on the total solid content of the electrocoating material (ECM).

Embodiment 3: aqueous electrocoating material (ECM) according to embodiment 1 or 2, characterized in that the at least one binder B1 contains cationic groups.

Embodiment 4: aqueous electrocoating material (ECM) according to embodiment 3, characterized in that the cationic groups are tertiary amino groups which, independently of one another, have at least two $C_1$-$C_3$ alkyl or $C_1$-$C_3$ hydroxy alkyl groups.

Embodiment 5: aqueous electrocoating material (ECM) according to any of the preceding embodiments, characterized in that the reactive functional groups of the at least one binder B1 are hydrogen groups.

Embodiment 6: aqueous electrocoating material (ECM) according to any of the preceding embodiments, characterized in that the complementary reactive functional groups of the at least one binder B1 are blocked isocyanate groups.

Embodiment 7: aqueous electrocoating material (ECM) according to any of the preceding embodiments, characterized in that the at least one crosslinker CA is selected from blocked polyisocyanates.

Embodiment 8: aqueous electrocoating material (ECM) according to any of the preceding embodiments, characterized in that the at least one crosslinker CA is present in a total amount of 15 to 30% by weight—based on the total solid content of the electrocoating material (ECM).

Embodiment 9: aqueous electrocoating material (ECM) according to any of the preceding embodiments, characterized in that the bismuth compound (c) has a bismuth content of from 70% to 75% by weight, based on the total weight of the bismuth compound (c).

Embodiment 10: aqueous electrocoating material (ECM) according to any of the preceding embodiments, characterized in that the bismuth compound (c) is selected from basic bismuth nitrates.

Embodiment 11: aqueous electrocoating material (ECM) according to embodiment 10, characterized in that the basic bismuth nitrate is a bismuth subnitrate of the empirical formula (II)

$$4(BiNO_3(OH)_2)BiO(OH) \qquad (II).$$

Embodiment 12: aqueous electrocoating material (ECM) according to any of the preceding embodiments, characterized in that the bismuth compound (c), preferably the bismuth subnitrate of empirical formula (II), is present in a total amount of 0.05 to 5% by weight, more preferably 0.5 to 4% by weight, based in each case on the solids content of the electrocoating material (ECM).

Embodiment 13: aqueous electrocoating material (ECM) according to any of the preceding embodiments, characterized in that the at least one compound C1 has an epoxy equivalent weight (EEW) of 160 to 450 g/Eq.

Embodiment 14: aqueous electrocoating material (ECM) according to any of the preceding embodiments, characterized in that at least two different compounds C1-1 and C1-2 are reacted with compounds C2 and C3 and C4.

Embodiment 15: aqueous electrocoating material (ECM) according to embodiment 14, characterized in that compound C1-1 has an epoxy equivalent weight of 160 to 250 g/Eq., preferably 170 to 220 g/Eq., very preferably 180 to 200 g/Eq.

Embodiment 16: aqueous electrocoating material (ECM) according to embodiment 14 or 15, characterized in that compound C1-2 has an epoxy equivalent weight of 350 to 450 g/Eq., preferably 360 to 430 g/Eq., very preferably 370 to 410 g/Eq.

Embodiment 17: aqueous electrocoating material (ECM) according to any of embodiments 14 to 16, characterized in that a molar ratio of compound C1-1 to compound C1-2 of 2:1 to 1:2, preferably 1.8:1, more preferably 1.8:1.4.

Embodiment 18: aqueous electrocoating material (ECM) according to any of the preceding embodiments, characterized in that compound C2 is selected from aromatic hydroxy compounds, very preferably 4-dodecyl phenol.

Embodiment 19: aqueous electrocoating material (ECM) according to any of the preceding embodiments, characterized in that residues $R^1$ and $R^2$ in general formula (I) are, independently from each other, selected from hydrogen.

Embodiment 20: aqueous electrocoating material (ECM) according to any of the preceding embodiments, characterized in that residue $R^3$ in general formula (I) is selected from hydrogen.

Embodiment 21: aqueous electrocoating material (ECM) according to any of the preceding embodiments, characterized in that a in general formula (I) is an integral number of 1 to 6, preferably 1 to 4, very preferably 2.

Embodiment 22: aqueous electrocoating material (ECM) according to any of the preceding embodiments, characterized in that b in general formula (I) is an integral number of 1 to 3, preferably 1 to 2, very preferably 1.

Embodiment 23: aqueous electrocoating material (ECM) according to any of the preceding embodiments, characterized in that the molar ratio of the at least one compound C3 of general formula (I) to the at least one compound C1 containing at least one epoxy group is 1:1 to 1:2.5, preferably 1:1 to 1:2, more preferably 1:1 to 1:1.7, very preferably 1:1.3 to 1:1.6.

Embodiment 24: aqueous electrocoating material (ECM) according to any of the preceding embodiments, characterized in that compound C4 is selected from 3-(dimethylamino)-1-propylamine.

Embodiment 25: aqueous electrocoating material (ECM) according to any of the preceding embodiments, characterized in that a catalyst, preferably triphenyl phosphine, is used to prepare the at least one binder B2.

Embodiment 26: aqueous electrocoating material (ECM) according to any of the preceding embodiments, characterized in that the electrocoating material (ECM) further comprises at least one additive, selected from the group consisting of pigments, fillers, wetting agents, dispersants, light stabilizers, corrosion inhibitors and mixtures thereof.

Embodiment 27: aqueous electrocoating material (ECM) according to any of the preceding embodiments, characterized in that the amount of dissolved bismuth in the electrocoating material (ECM) is in the range of 600 to 2,000 ppm, preferably 800 to 1,800 ppm, very preferably 900 to 1,500 ppm, based in each case on the total weight of the electrocoating material (ECM).

Embodiment 28: aqueous electrocoating material (ECM) according to any of the preceding embodiments, characterized in that the electrocoating material (ECM) has a solids content of 10 to 30 wt. %, preferably 15 to 25 wt. %, based in each case on the total weight of the electrocoating material (ECM).

Embodiment 29: a method for at least partly coating an electrically conductive substrate, said method comprising:
(a) contacting the electrically conductive substrate, preferably connected as cathode, with the aqueous electrocoating material (ECM) according to any of embodiments 1 to 28,
(b) optionally rinsing the coating layer obtained after step (a), and
(c) curing the coating layer obtained after step (a) or (b).

Embodiment 30: the method according to embodiment 29, characterized in that step (a) is performed at a temperature of 25 to 35° C. and a voltage of 120 to 350 V, 150 to 320 V.

Embodiment 31: the method according to embodiments 29 or 30, characterized in that the curing is performed at 100 to 250° C., preferably 130 to 190° C. for a duration of 10 to 30 minutes, preferably 15 minutes.

Embodiment 32: the method according to any of embodiments 29 to 31, characterized in that the electrically conductive substrate comprises a motor vehicle or part thereof.

Embodiment 33: a coated substrate obtained by the method according to any of embodiments 29 to 32.

Embodiment 34: a component or article, more particularly automobile body, which comprises the coated substrate according to embodiment 33.

EXAMPLES

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. Methods of Determination:

1.1 Solids Content (Solids, Nonvolatile Fraction)

The nonvolatile fraction is determined according to DIN EN ISO 3251 (date: June 2008). It involves weighing out 1 g of sample into an aluminum dish which has been dried beforehand, drying it in a drying oven at 130° C. for 60 minutes, cooling it in a desiccator and then reweighing it. The residue relative to the total amount of sample used corresponds to the nonvolatile fraction.

1.2 Determination of Glass Transition Temperature $T_g$

The glass transition temperature $T_g$ is determined with differential scanning calorimetry (DSC) according to DIN 53765:1994-03 using a heating rate of 10 K/min.

1.3 Determination of Crosslinkinq Start Temperature and Duration of Crosslinkinq with DMA The crosslinking start temperature of the deposited electrocoating materials and the duration of the crosslinking is determined experimentally by means of dynamic mechanical thermal analysis (DMTA). In the DMTA, by applying an oscillating force to the sample, the mechanical properties are determined quantitatively depending on the temperature, time and frequency. Most samples are elastic (stiff) and viscous (dampening) at the same time, i.e. they are viscoelastic. Thus, an applied load is partly released by viscous flow with a permanent deformation. At the same time, the mechanical behavior depends on temperature, time, height and type of the applied load. Instead of using a free coating film a small amount of the material to be examined is applied on a piece of a carbon fiber net which is clamped in the device.

The measurements were made with a Triton 2000B type instrument from Triton Technology according to the procedure described in patent application DE 4 409 715 A1. However, a carbon fiber net is used instead of a glass fiber net. The measurement takes place in a temperature range relevant to the sample (here: from 2° C. to 200° C.).

Depending on the temperature control, two types of measurement are possible:

Start of Crosslinking—Onset Measurement:

Throughout the measurement, the measured tan δ and E' values are affected by the properties of the carbon fiber network, so the values should not be used as absolute values. As soon as the crosslinking of the electrocoating material begins, however, these values change drastically. The temperature at which this change begins marks the onset of crosslinking and is determined graphically from the memory module/temperature diagram. It is the temperature of the intersection of the extrapolated baseline of the memory module prior to onset crosslinking and the extrapolated straight line resulting from the quasi-linear ramp up region of the memory module after onset of crosslinking. In this way, the crosslinking start temperature can be accurately determined to +/−2° C.

Crosslinking Duration—Offset Measurement:

The temperature during the measurement is changed according to the line condition characteristic of the deposited electrocoating material (furnace curve). As soon as the crosslinking of the deposited material starts, E' increases and then assumes a constant value after completion of the crosslinking. Throughout the measurement, the measured E' values are affected by the properties of the carbon fiber network, so the values should not be used as absolute values. With this measurement, the offset time, i.e. the time necessary for sufficient crosslinking at a given temperature mode, can be determined.

1.4 Determination of pH Value

The pH value was determined according to DIN 55659-1 (January 2012).

1.5 Determination of Conductivity

The conductivity was determined according to DIN EN ISO 15091 (April 2013).

1.6 Determination of Ash Content

The ash content was determined according to DIN EN ISO 14680-2 (April 2006)

1.7 Determination of Overall Bismuth Content and Amount of Dissolved Bismuth

The amount of dissolved bismuth and the total amount of bismuth is determined using inductively coupled plasma atomic emission spectrometry (ICP-OES). In this method, the sample is subjected to thermal excitation in an argon plasma generated by a high-frequency field, the light emitted due to electron transitions becomes visible as a spectral line of the corresponding wavelength, and is analyzed using an optical system. There is a linear relation between the intensity of the light emitted and the concentration of bismuth. Prior to implementation, using known bismuth standards (reference standards), calibration measurements are carried out as a function of the particular sample under investigation. These calibrations can be used to determine concentrations of unknown solutions such as the concentration of the amount of bismuth in the electrocoating materials.

A fundamental distinction is made here between bismuth which is present in a form dissolved in the electrocoating material and bismuth present in a form undissolved in the electrocoating material. The total fraction of bismuth in the electrocoating material is then obtained from the sum total of bismuth present in dissolved form and the bismuth present in undissolved form.

The bismuth present in dissolved form is determined from the electrocoating material as follows:

The respective electrocoating material is centrifuged at 11,990 rpm for the duration of 30 minutes. Afterwards, 5 g of the supernatant is diluted with 30 to 40 ml of a solution containing, based on the total weight of the solution, 90% by weight deionized water, 5% by weight acetic acid and 5% by weight 1-methoxy-2-propanol. Then, 250 µl of an internal standard (1,000 mg/l scandium standard solution) and 1 ml of a $CsNO_3$ solution (7.3 g $CsNO_3$ in 100 ml deionized water) are added (in case of flocculation, the sample is treated in an ultrasonic bath until a clear solution is obtained) and the mixture is transferred to a 50 ml volumetric flask. The flask is filled to the calibration mark with deionized water and is measured with ICP-OES in accordance with DIN EN ISO 11885 (August 2009). It is assumed here that the bismuth present in dissolved form in the respective electrocoating material is transferred completely into the supernatant.

The above-described method of determination can be used, moreover, to determine the total fraction of bismuth in the respective electrocoating material (ECM-1) or (ECM-2) as follows:

The respective electrocoating material is homogenized using an ultrasonic bath for 5 to 10 minutes. Then, 1.5±0.1 g of the respective material is diluted with 30 to 40 ml of a solution containing, based on the total weight of the solution, 90% by weight deionized water, 5% by weight acetic acid and 5% by weight 1-methoxy-2-propanol. Then, 250 µl of an internal standard (1000 mg/l scandium standard solution) and 1 ml of a $CsNO_3$ solution (7.3 g $CsNO_3$ in 100 ml deionized water) are added (in case of flocculation, the sample is treated in an ultrasonic bath until a clear solution is obtained) and the mixture is transferred to a 50 ml volumetric flask. The flask is filled to the calibration mark with deionized water and is measured with ICP-OES in accordance with DIN EN ISO 11885 (August 2009).

When the fraction present in dissolved form is subtracted from this total fraction, the dissolved fraction being determined as explained above, the result is the fraction of bismuth that is present in undissolved form.

1.8 Determination of Epoxy Equivalent Weight

The epoxy equivalent weight is determined according to DIN EN ISO 3001:1999-11.

1.9 Determination of Viscosity of Grind Resins

The viscosity of the grind resin GR1 (corresponding to binder B2 prepared according to the invention) as 45% solution in methoxy propanol was measured according to DIN EN ISO 3219:1994-10 and DIN 53019:2008-09 at 23° C. and a shear rate of 10,000 $s^{-1}$ using a Brookfield CAP2000+ viscosimeter; cone plate configuration; Cone CAP 03. The viscosity of the grind resin GR2 (corresponding to binder B2 not being prepared according to the invention) was determined according to DIN EN ISO 3219: 1994-10 and DIN 53019:2008-09 at 23° C. and a shear rate of 150 s$^{-1}$ using a Rotation viscosimeter Rheolab QC; cylinder geometry; cylinder Z3.

1.10 Determination of Dry Film Thicknesses

The film thicknesses are determined according to DIN EN ISO 2808 (date: May 2007), method 12A, using the MiniTest® 3100-4100 instrument from ElektroPhysik.

2. Preparation of Aqueous Electrocoating Materials (ECM)

The following should be taken into account regarding the formulation constituents and amounts thereof as indicted in the tables hereinafter. When reference is made to a commercial product or to a preparation protocol described elsewhere, the reference, independently of the principal designation selected for the constituent in question, is to precisely this commercial product or precisely the product prepared with the referenced protocol.

2.1 Preparation of Cationic Grind Resin Dispersions GR1 and GR2

The grind resins GR1 and GR1 are prepared by using the amounts of components 1 to 9 stated in Table 1 below as follows:

Components 1 to 3a or 1 to 3b, respectively, are loaded into a reactor and heated to 125° C. Afterwards, the catalyst 4 is added in two portions and the reaction is continued at 125° C. until the epoxy equivalent weight is determined to be 271 g/mol to ensure complete conversion of component 3a or 3b, respectively. The reactor is cooled to 50 to 90° C. and component 5 is added. Afterwards, component 6 is added and an exothermic reaction of the amine with the epoxy groups is observed. After addition of component 7, the reactor is held at 110° C. for 2 to 3 hours until complete conversion of the epoxy groups is achieved (corresponds to an epoxy equivalent weight of >40.000 g/mol). The respective resin is dispersed in a mixture of components 8 and 9 to obtain the cationic grind resin dispersions GR1 and GR2, respectively.

TABLE 1

Components used in the preparation of grind resins dispersions GR1 and GR2 (all amounts are given in % by weight, based on the total weight of the respective grind resin dispersion)

| # | Ingredient | dispersion GR1 | dispersion GR2 |
|---|---|---|---|
| 1 | Compound C1-1 [1] | 12.36 | 13.62 |
| 2 | Compound C1-2 [2] | 4.46 | 4.92 |
| 3a | Compound C2 [3] | 2.17 | 2.39 |
| 3b | Compound C2 [4] | — | 4.15 |
| 4 | Triphenyl phosphine | 0.02 | 0.02 |
| 5 | Compound C1-2 [2] | 11.15 | 12.92 |
| 6 | Compound C3 of formula (1) [5] | 3.72 | 2.17 |
| 7 | Compound C4 [6] | 1.13 | 1.24 |
| 8 | Acetic acid (50% solution in water) | 1.73 | 1.35 |
| 9 | Distilled water | 63.28 | 57.85 |

[1] high viscosity liquid epoxy resin based on Bisphenol A diglycidyl ether, epoxy equivalent = 184 to 190 mol/g (determined according to ISO3001), viscosity at 25° C. = 12,000 to 14,000 mPa*s (determined according to ISO 12058-1, falling ball) (supplied by Huntsman)
[2] Polypropylenglycol diglycidyl ether, epoxy equivalent = 385 to 405 mol/g (determined according to ISO3001), viscosity at 25° C. = 42 to 52 mPa*s (determined according to ISO 12058-1, falling ball) (supplied by Huntsman)
[3] 4-docecyl phenol
[4] Bisphenol A
[5] $R^1$ to $R^3$ = hydrogen, a = 2, b = 1
[6] 3-(dimethylamino)-1-propylamine The cationic grind resin dispersion GR1 has a solids content of 35% (see point 1.1 above), a viscosity of about 150 to 230 m*Pas (see point 1.9 above) and a theoretically calculated base equivalent of 1.64 meq/g of solid resin. The molar ratio of compound C3 of formula (I) with $R^1$ to $R^3$=hydrogen, a=2, b=1 to epoxy compounds C1-1 and C1-2 in grind resin GR1 is 1:1.49. The molar amount was calculated by using the total molar amount of the epoxy compounds C1-1 and C1-2 as well as compound C3 used to prepare the grind resin GR1.

The cationic grind resin dispersion GR2 has a solids content of 40.8% (see point 1.1 above), a viscosity of 500 to 4,000 m*Pas (see point 1.9 above) and a theoretically calculated base equivalent of 1.10 meq/g of solid resin. The molar ratio of compound C3 of formula (I) with $R^1$ to $R^3$=hydrogen, a=2, b=1 to epoxy compounds C1-1 and C1-2 in grind resin GR2 is 1:2.8. The molar amount was calculated by using the total molar amount of the epoxy compounds C1-1 and C1-2 as well as compound C3 used to prepare the grind resin GR2.

2.2. Preparation of Piment Pastes P1 to P3

The pigment pastes P1 to P3 were prepared according to the procedure described in European Patent EP 0 505 455 B1 on page 10, lines 35 to 42 using the starting materials listed in Table 2 below. For this purpose, deionized water and the respective grinding resin GR1 or GR2 are premixed. Then the remaining ingredients according to the amounts stated in Table 2 are added and the obtained mixture is stirred for 30 minutes in a high-speed dissolver stirrer. Subsequently, the mixture is dispersed in a small laboratory mill for 1 to 1.5 hours to a Hegmann fineness of less than 12. During or after the grinding, the viscosity is adjusted to 1,400±400 mPa*s (determined with a rotational viscosimeter Rheolab QC (Paar Instruments) using a CC39 measuring system at a temperature of 25° C. and a shear rate of 10 s$^{-1}$) with water.

TABLE 2

Components used in the preparation of pigment pastes P1 to P3 (all amounts are given in % by weight, based on the total weight of the pigment paste)

| Ingredient | Paste P1 | Paste P2 | Paste P3 |
|---|---|---|---|
| Dispersion GR1 | 47.4 | 47.4 | — |
| Dispersion GR2 | — | — | 39.25 |
| Deionized water | 0.25 | 0.25 | 8.4 |
| Disperbyk 111 [1] | 0.30 | 0.3 | 0.30 |
| Bismuth subnitrate | 6.0 | 4.0 | 6.0 |
| Carbon black | 0.40 | 0.4 | 0.40 |
| Aluminosilicate | 10 | 10.0 | 10 |
| Barium sulfate blanc fixe micro | 8.2 | 8.2 | 8.2 |
| Lanco Wax PEW 1555 [2] | 0.20 | 0.2 | 0.20 |
| TI-PURE R900 [3] | 24.25 | 26.25 | 24.25 |
| Deuteron MK-F6 [4] | 3.0 | 3.0 | 3.0 |

[1] copolymer with acidic groups, wetting additive, supplied by (Byk)
[2] Hydrophilically modified, micronized polyethylene wax, supplied by Lubrizol
[3] titanium dioxide, supplied by DuPont
[4] Thermosetting polyurea powder, supplied by Deuteron 2.3. Preparation of Aqueous Electrocoating Materials (ECM)

For testing as cathodically depositable electrocoat materials, the aqueous binder dispersion (BD) and respective pigment paste P1 to P3 described above are combined in accordance with Table 3 below. The procedure here is to introduce the binder dispersion (BD) as an initial charge and to dilute it with deionized water. Subsequently, with stirring, the pigment paste is introduced

TABLE 3

Components used in the preparation of aqueous electrocoating materials (all amounts are given in % by weight, based on the total weight of the electrocoating material (ECM))

|  | ECM-1* | ECM-2* | ECM-3 |
|---|---|---|---|
| Binder dispersion (BD) [1] | 2,321 | 2,321 | 2,321 |
| Pigment paste P1 (solids content: 59.7%) | 368.0 | — | — |
| Pigment paste P2 (solids content: 60.2%) | — | 364.0 | — |
| Pigment paste P3 (solids content: 66.5%) | — | — | 331.0 |
| Deionized water | 2,811 | 2,815 | 2,848 |

*inventive
[1] aqueous dispersion of a cationic binder and a crosslinking agent (commercially available product CathoGuard ® 800 from BASF with a solids content of 38.0 wt. %)

3. Testing of the Aqueous Electrocoating Materials (ECM)

3.1 Determination of Characteristic Parameters of the Electrocoating Materials The pH value and the conductivity at 20° C., the solid content, the ash content, the total bismuth content and the content of dissolved bismuth is determined for the inventive aqueous electrocoating materials (ECM-1) and (ECM-2) as well as for the comparative electrocoating material (ECM-3). The obtained values are listed in Table 4 below.

TABLE 4

Characteristic parameters of electrocoating materials ECM-1 to ECM-3

|  | ECM-1* | ECM-2* | ECM-3 |
|---|---|---|---|
| pH value (20° C.) | 5.5 | 5.5 | 5.6 |
| Conductivity (20° C.) | 1.97 | 1.96 | 1.89 |
| Solid content | 18.5% | 18.5% | 18.5% |
| Ash content based on solid content | 14.0% | 14.1% | 13.9% |
| Total bismuth content | 2,679 ppm | 1,696 ppm | 2,671 ppm |
| Content of dissolved bismuth | 1,390 ppm | 1,126 ppm | 670 ppm |

*inventive

The inventive aqueous electrocoating materials (ECM-1) and (ECM-2) have a comparative pH, conductivity, solid content and ash content as the comparative aqueous electrocoating material (ECM-3). However, the amount of dissolved bismuth is significantly higher in the inventive coating materials (ECM-1) and (ECM-2) due to the use of the binder B2 prepared by using a molar ratio of the compound C3 of general formula (I) to the epoxy compounds C1-1 and C1-2 of 1:1.49. Surprisingly, the amount of dissolved bismuth in inventive coating composition (ECM-2) is significantly higher than in comparative coating composition (ECM-3), even though the inventive coating composition (ECM-2) contains significantly smaller amounts of bismuth subnitrate. Thus, the use of binder B2 in the inventive coating compositions allows to significantly reduce the amount of bismuth used in the pigment paste without significantly reducing the amount of dissolved bismuth in the electrocoating material.

3.2 Deposition on Electrically Conductive Substrates

The electrocoating materials ECM-1 to ECM-3 are aged at room temperature with stirring for 24 h, respectively. The electrocoat materials are then deposited on zinc-phosphatized steel panels (Gardobond GB26S 6800 OC, supplied by Chemetall) connected as cathodes. The deposition time is 120 s at a bath temperature of 32° C. and a deposition voltage of 240 to 320 V.

The deposited coating films are rinsed with deionized water and baked for 15 minutes at 175° C. (substrate temperature) or the temperatures specified for the determination of the glass transition temperature $T_g$ (see point 3.3 below).

Materials ECM-1 to ECM-3 were deposited electrophoretically without problems on the respective steel substrates. The resulting electrocoats had good flow and were free from surface defects and specks.

3.3 Determination of Coating Properties and Glass Transition Temperatures $T_g$ The dry film thickness and flow as well as the glass transition temperature $T_g$ of the cured electrocoatings obtained in step 3.2 were determined as described in point 1. The results are listed in Table 5.

TABLE 5

Coating properties and $T_g$ of cured electrocoating EC-1 (prepared from ECM-1), EC-2 (prepared from ECM-2) and EC-3 (prepared from ECM-3)

|  | EC-1* | EC-2* | EC-3 |
|---|---|---|---|
| Dry film thickness | 19-21 μm | 19-21 μm | 19-21 μm |
| Flow | Excellent | Excellent | Excellent |
| Glass transition temperature $T_g$ (150° C.) | 58° C. | 55° C. | 52° C. |
| Glass transition temperature $T_g$ (155° C.) | 67° C. | 62° C. | 59° C. |
| Glass transition temperature $T_g$ (160° C.) | 77° C. | 73° C. | 69° C. |
| Glass transition temperature $T_g$ (165° C.) | 82° C. | 80° C. | 76° C. |
| Glass transition temperature $T_g$ (170° C.) | 88° C. | 87° C. | 83° C. |
| Glass transition temperature $T_g$ (175° C.) | 92° C. | 92° C. | 89° C. |
| Glass transition temperature $T_g$ (185° C.) | 92° C. | 92° C. | 91° C. |
| DMA-Onset temperature | 141° C. | 142° C. | 145° C. |

*inventive

The development of the glass transition temperatures $T_g$ as a function of the curing temperature shows consistently higher values and thus higher crosslinking density for the cured electrocoatings EC-1 and EC-2 prepared with the inventive aqueous electrocoating materials (ECM-1) and (ECM-2) in comparison to the electrocoating EC-3 prepared from the comparative aqueous material (ECM-3). A similar crosslinking density is only obtained at a curing temperature of 185° C. Below this temperature, the cured coating layers obtained with the inventive electrocoating materials have a higher $T_g$ value and thus crosslinking density, i.e. they can be cured at lower temperatures compared to the non-inventive electrocoating material even if the amount of bismuth salt acting as catalyst is significantly reduced (cf. ECM-2 vs. ECM-3). Thus, the use of the inventive electrocoating materials (ECM-1) and (ECM-2) to prepare electrocoatings on metallic substrates results in a lower risk of underbaking as compared to the comparative electrocoating material (ECM-3).

The invention claimed is:
1. An aqueous electrocoating material (ECM) comprising
    (a) at least one binder B1 containing cationic or anionic groups and reactive functional groups which are able to undergo crosslinking reactions
        with complementary reactive functional groups present in a crosslinking agent (b), wherein the reactive functional groups are hydroxy groups

(b) at least one crosslinking agent CA comprising the complementary reactive functional groups,
(c) at least one bismuth compound and
(d) at least one binder B2, said binder B2 being different from the at least one binder B1 and being obtained by reacting:
  (d-1) at least one compound C1 containing at least one epoxy group with
  (d-2) at least one hydroxy group containing compound C2 and
  (d-3) at least one compound C3 of general formula (I)

$$R^1R^2N\text{—}(CH_2)_a\text{—}O\text{—}[CH_2\text{—}CH(R^3)]_b\text{—}OH \qquad (I)$$

wherein
$R^1$, $R^2$ independently from each other, are hydrogen or a $C_1$-$C_4$ alkyl residue;
$R^3$ is hydrogen or a $C_1$-$C_4$ alkyl residue;
a is an integral number of 1 to 8; and
b is an integral number of 1 to 4; and
  (d-4) optionally at least one compound C4 comprising at least one primary and at least one tertiary amino group,
characterized in that
the molar ratio of compound C3 of general formula (I) to the at least one compound C1 containing at least one epoxy group is 1:1 to 1:2.5.

2. The aqueous electrocoating material (ECM) according to claim 1, characterized in that the at least one binder B1 contains cationic groups.

3. The aqueous electrocoating material (ECM) according to claim 1, characterized in that the at least one crosslinker CA is selected from the group consisting of blocked polyisocyanates.

4. The aqueous electrocoating material (ECM) according to claim 1, characterized in that the bismuth compound (c) is selected from the group consisting of basic bismuth nitrates.

5. The aqueous electrocoating material (ECM) according to claim 4, characterized in that the basic bismuth nitrate is a bismuth subnitrate of the empirical formula (II)

$$4(BiNO_3(OH)_2)BiO(OH) \qquad (II).$$

6. The aqueous electrocoating material (ECM) according to claim 1, characterized in that the bismuth compound (c), is present in a total amount of 0.05 to 5% by weight, based in on the solids content of the electrocoating material (ECM).

7. The aqueous electrocoating material (ECM) according to claim 1, characterized in that residues $R^1$ and $R^2$ in general formula (I) are, independently from each other, hydrogen.

8. The aqueous electrocoating material (ECM) according to claim 1, characterized in that residue $R^3$ in general formula (I) is hydrogen.

9. The aqueous electrocoating material (ECM) according to claim 1, characterized in that a in general formula (I) is an integral number of 1 to 6.

10. The aqueous electrocoating material (ECM) according to claim 1, characterized in that b in general formula (I) is an integral number of 1 to 3.

11. The aqueous electrocoating material (ECM) according to claim 1, characterized in that the amount of dissolved bismuth in the electrocoating material (ECM) is in a range of 600 to 2,000 ppm, based on the total weight of the electrocoating material (ECM).

12. A method for at least partly coating an electrically conductive substrate, said method comprising:
  (a) contacting the electrically conductive substrate with the aqueous electrocoating material (ECM) according to claim 1,
  (b) optionally rinsing the coating layer obtained after step (a), and
  (c) curing the coating layer obtained after step (a) or (b).

13. A coated substrate obtained by the method according to claim 12.

14. The aqueous electrocoating material (ECM) according to claim 1, characterized in that the bismuth subnitrate of empirical formula (II), is present in a total amount of 0.5 to 4% by weight, based on the solids content of the electrocoating material (ECM).

15. The aqueous electrocoating material (ECM) according to claim 1, characterized in that a in general formula (I) is an integral number of 1 to 4.

16. The aqueous electrocoating material (ECM) according to claim 1, characterized in that b in general formula (I) is an integral number of 1 to 2.

17. The aqueous electrocoating material (ECM) according to claim 1, characterized in that the molar ratio of compound C3 of general formula (I) to the at least one compound C1 containing at least one epoxy group is in a range of 1:1 to 1:2.

* * * * *